United States Patent
Suzumura et al.

(10) Patent No.: US 8,181,105 B2
(45) Date of Patent: *May 15, 2012

(54) APPARATUS, METHOD, AND PROGRAM THAT PERFORMS SYNTAX PARSING ON A STRUCTURED DOCUMENT IN THE FORM OF ELECTRONIC DATA

(75) Inventors: Toyotaro Suzumura, Tokyo (JP);
Michiaki Tatsubori, Kanagawa-ken (JP); Naohiko Uramoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1055 days.

This patent is subject to a terminal disclaimer.

(21) Appl. No.: 12/061,747

(22) Filed: Apr. 3, 2008

(65) Prior Publication Data

US 2008/0288858 A1    Nov. 20, 2008

Related U.S. Application Data

(63) Continuation of application No. 11/567,242, filed on Dec. 6, 2006, now Pat. No. 7,707,491.

(30) Foreign Application Priority Data

Dec. 27, 2005  (JP) ................................. 2005-374990

(51) Int. Cl.
  *G06F 17/00*  (2006.01)
(52) U.S. Cl. ...................................... 715/234; 717/143
(58) Field of Classification Search .................. 715/234; 717/143
See application file for complete search history.

(56) References Cited

U.S. PATENT DOCUMENTS

| 4,241,402 | A | * | 12/1980 | Mayper et al. | ......................... 1/1 |
| 6,470,362 | B1 | * | 10/2002 | Eustace et al. | ................. 715/234 |
| 7,493,603 | B2 | | 2/2009 | Fuh et al. | |
| 2003/0154444 | A1 | | 8/2003 | Tozawa et al. | |
| 2003/0229852 | A1 | | 12/2003 | Uramoto et al. | |
| 2006/0218161 | A1 | * | 9/2006 | Zhang et al. | ................... 707/100 |

(Continued)

FOREIGN PATENT DOCUMENTS

EP    2219117 A1 * 8/2010

(Continued)

OTHER PUBLICATIONS

Safra, Schamai et al. "Modeling Pronunciation Variations and Coarticulation with Finite-state Transducers in CSR". 2004, International Symposium on Computer Architecture.*

(Continued)

*Primary Examiner* — Cesar Paula
*Assistant Examiner* — Tyler J. Schallhorn
(74) *Attorney, Agent, or Firm* — Gibb I.P. Law Firm, LLC

(57) ABSTRACT

Statistical information about instance documents and schema information are used to integrate multiple state transitions that enable sectioning of a structure document, thereby generating an optimum automaton. In integrating state transitions, consecutively matching state transitions are held in the form of an ID list, which is then used to count the number of consecutive state transitions. Furthermore, patterns in the number of occurrences of repetitive elements including nested elements are statistically obtained. Variations of blanks in XML are addressed by using a statistical method. Schema information is used to build an automaton beforehand, thereby initialization overhead of the syntax parsing apparatus is reduced.

18 Claims, 11 Drawing Sheets

U.S. PATENT DOCUMENTS

2007/0113170 A1    5/2007   Dignum et al.
2007/0113222 A1*  5/2007   Dignum et al. ............... 717/143
2008/0294614 A1* 11/2008  Miyashita et al. ................ 707/4

FOREIGN PATENT DOCUMENTS

| | | |
|---|---|---|
| JP | 9-319632 | 12/1997 |
| JP | 2004-062716 | 2/2004 |
| JP | 2004-314713 | 11/2004 |
| JP | 2006-024179 | 1/2006 |

OTHER PUBLICATIONS

Chen, Danny et al. "Optimizing The Lazy DFA Approach for XML Stream Processing". 2004, Australian Computer Society.*

Suzumura et al., U.S. Appl. No. 11/567,242, JP920050138US1, Notice of Allowance, Dec. 9, 2009, 5 pages.

Jian, Jinhui, "Efficient XML Stream Processing with Automata and Query Algebra," Aug. 2003, Worcester Polytechnic Institute.

Onizuka, Makoto, "Light-Weight XPath Processing of XML Stream with Deterministic Automata," Nov. 2003, Association for Computing Machinery.

Takase et al., "An Adaptive, Fast, and Safe XML Parser Based on Byte Sequences Memorization," May 2005, Association for Computing Machinery.

Green et al., "Processing XML Streams with Deterministic Automata and Stream Indexes," Dec. 2004, Association for Computing Machinery.

* cited by examiner

[Figure 1]
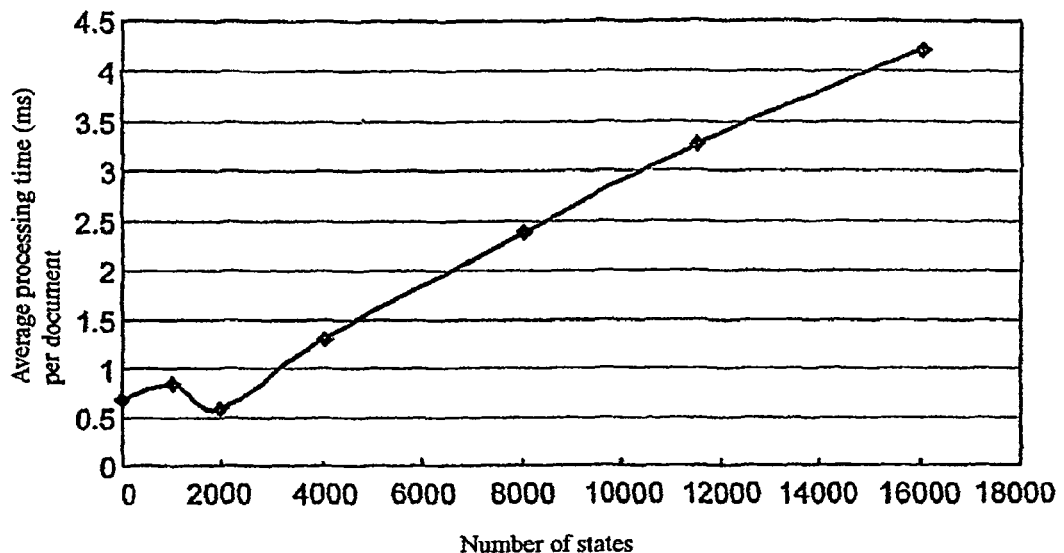
[Figure 2]
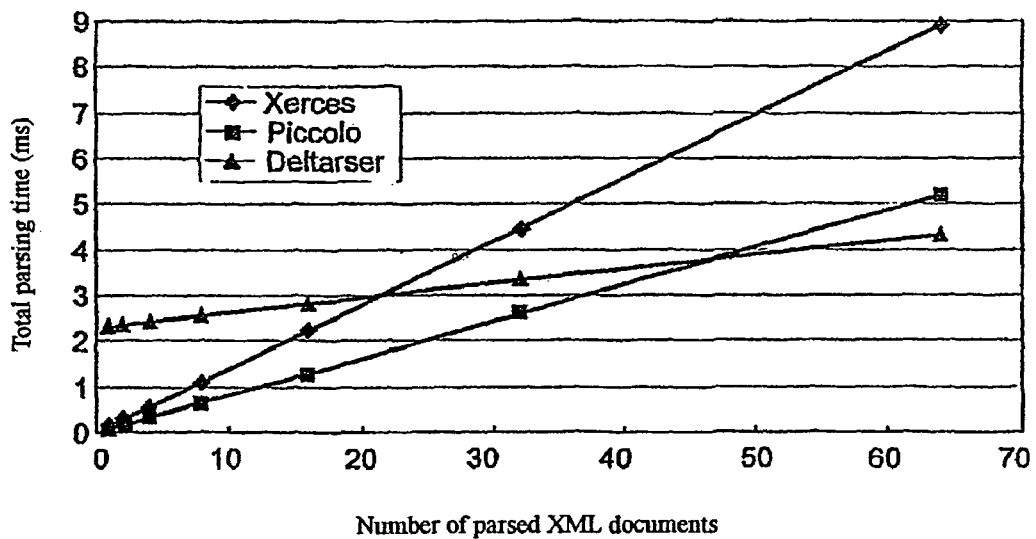

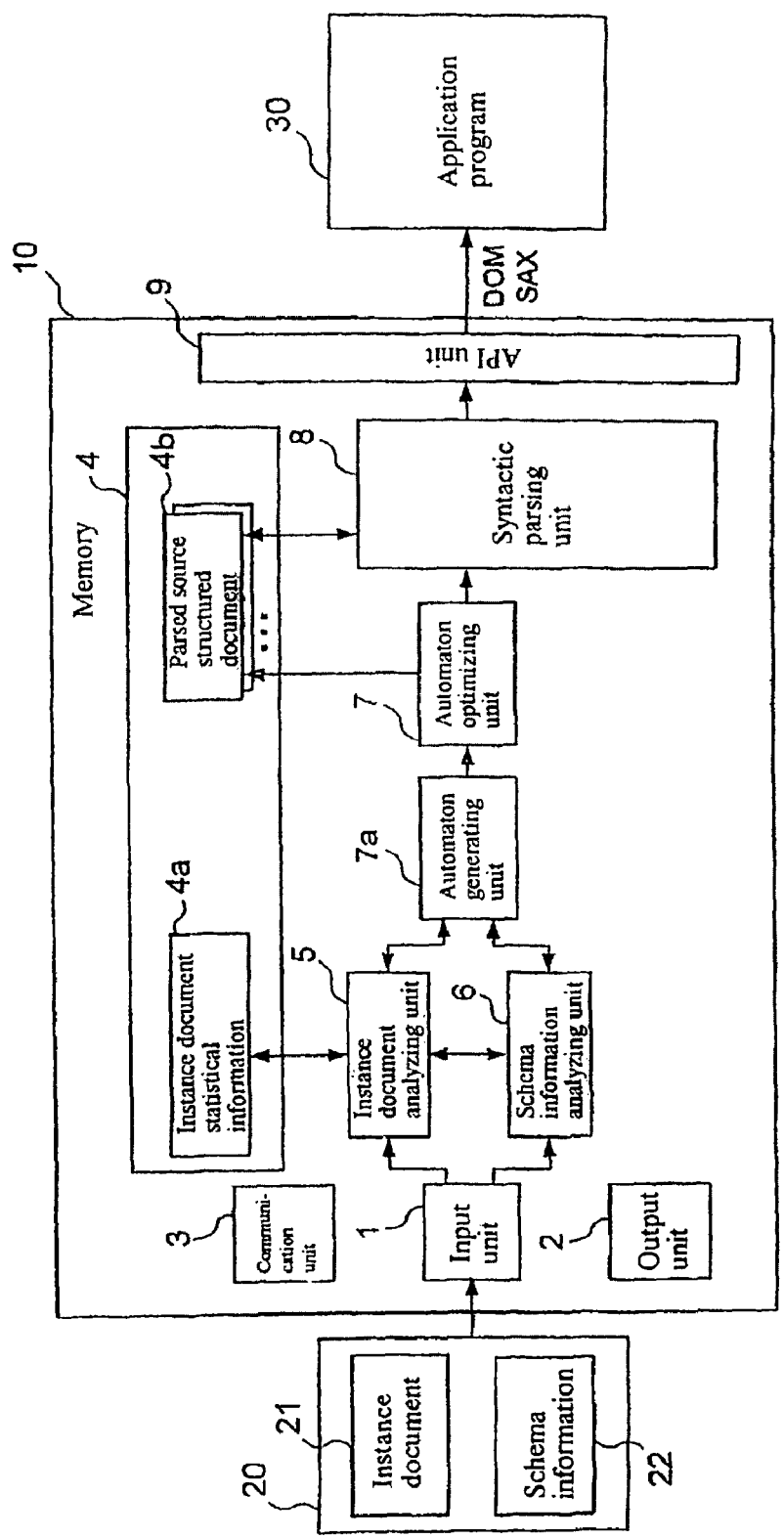
[Figure 3]

[Figure 4]
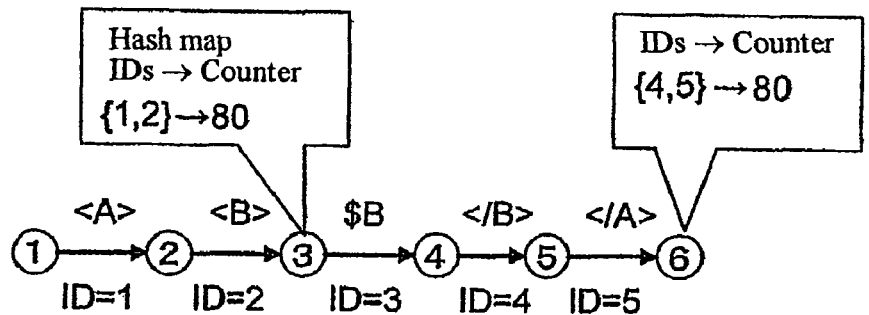
[Figure 5]
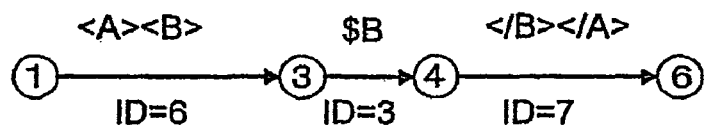
[Figure 6]
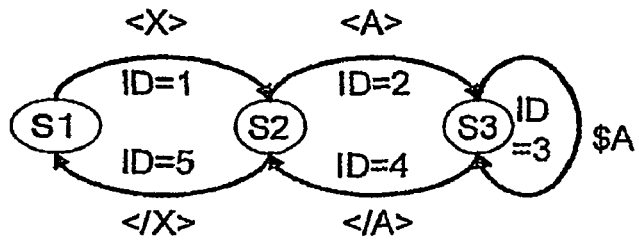
[Figure 7]
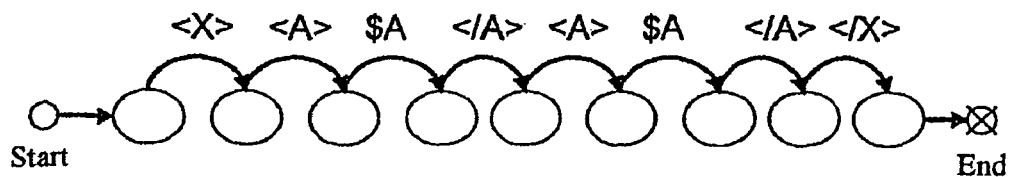

[Figure 8]
```
<A>
 <B>
    <C>1</C><C>2</C><C>3</C><C>4</C>
 </B>
 <B>
    <C>1</C><C>1</C>
 </B>
</A>
```
[Figure 9]
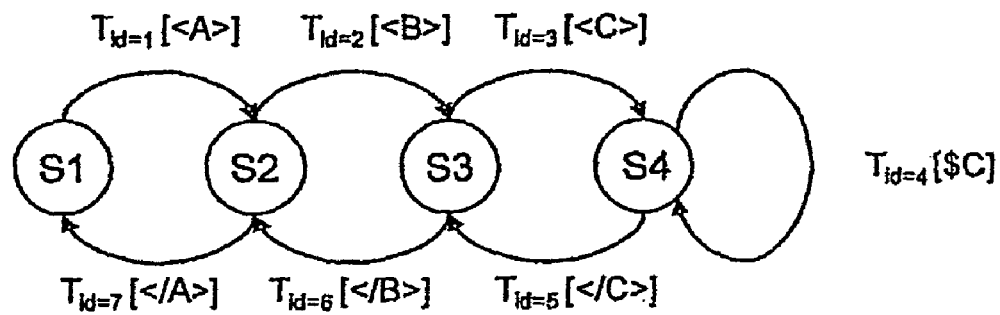

[Figure 10]
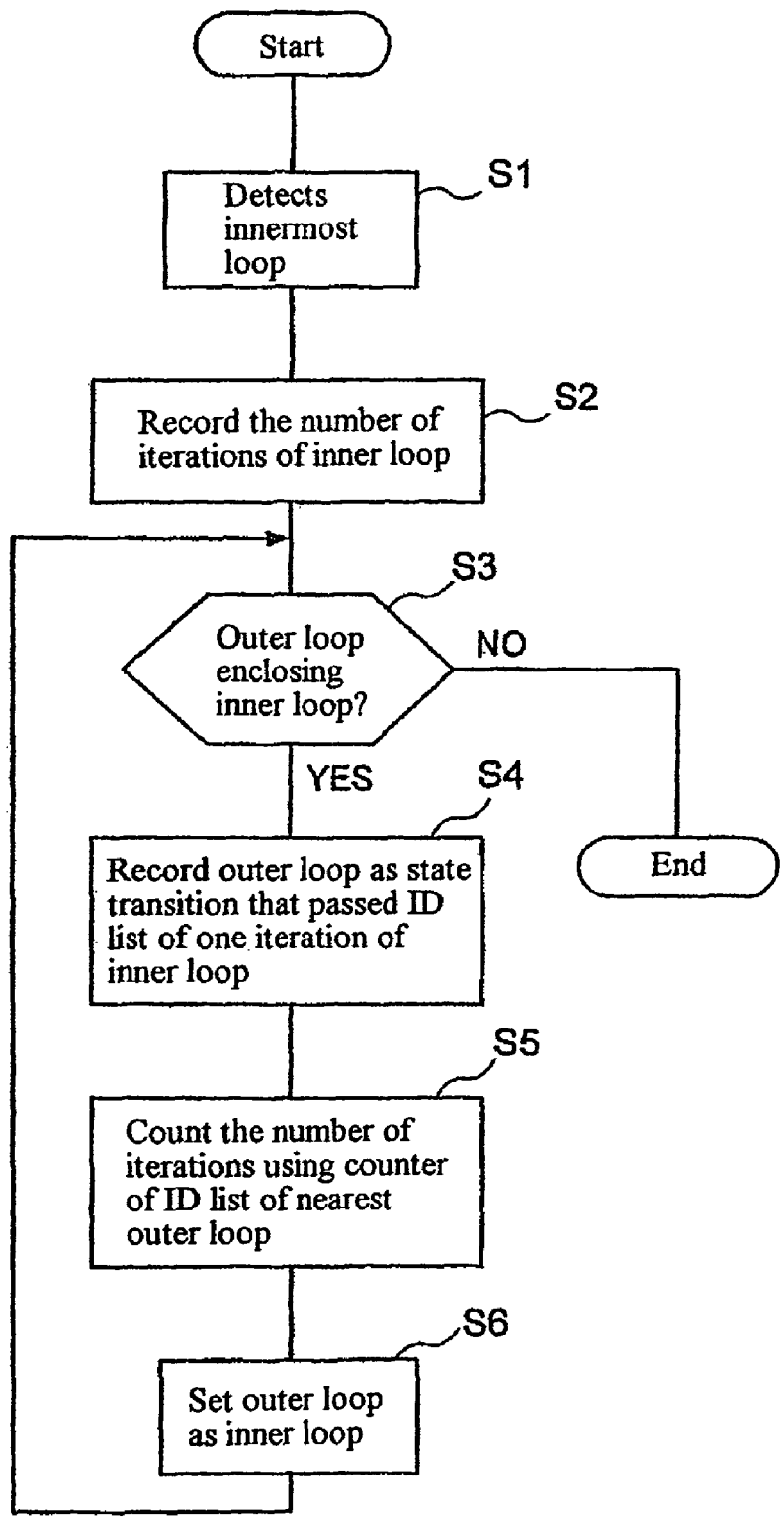

[Figure 11]
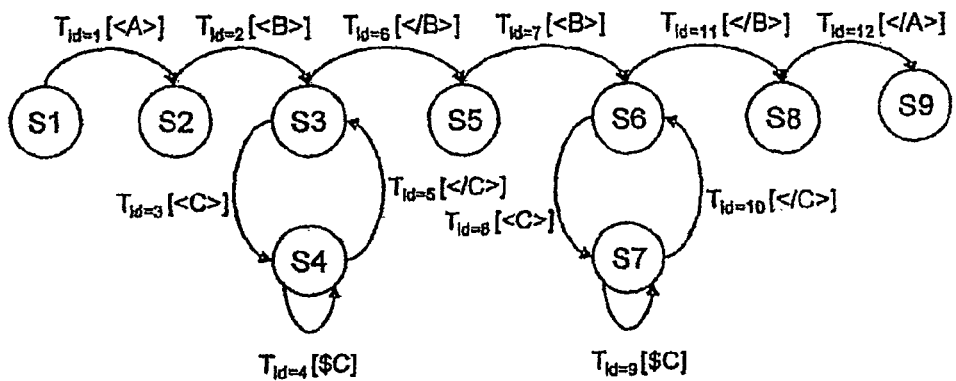
[Figure 12]
```
<A>
  <B>
     <C>1</C><C>2</C>
  </B>
  <B>
     <C>3</C><C>4</C>
  </B>
  <B>
     <C>5</C><C>6</C>
  </B>
  <B> ······ (Omitted)
</A>
```
[Figure 13]
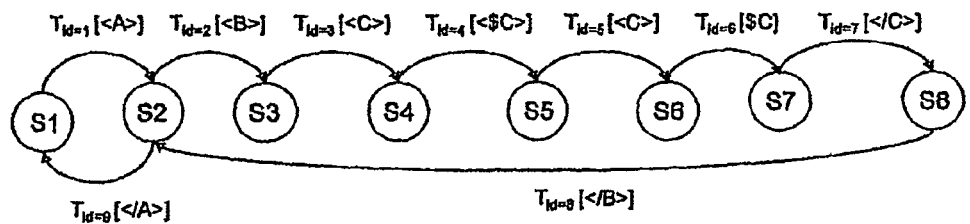

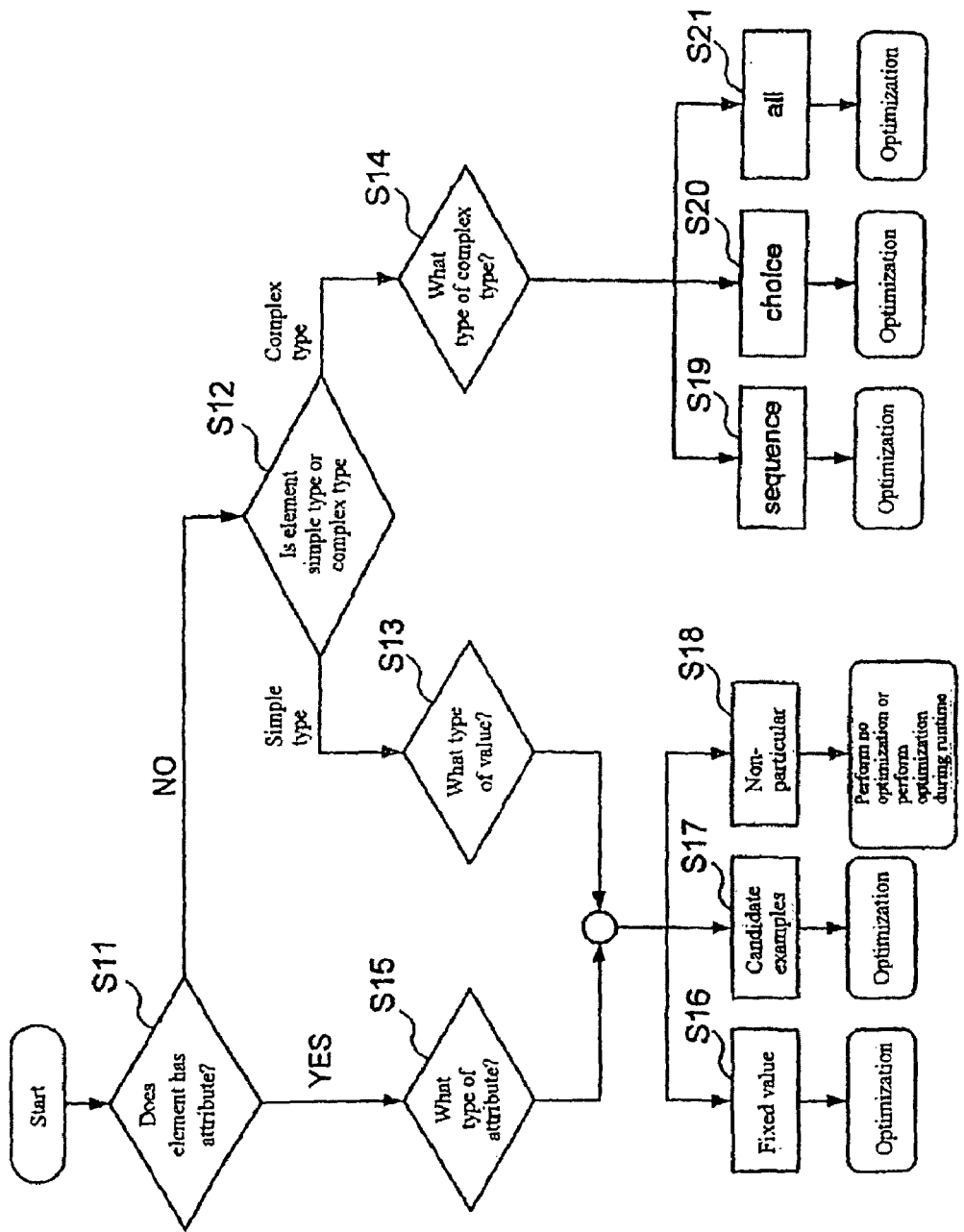
[Figure 14]

[Figure 15]

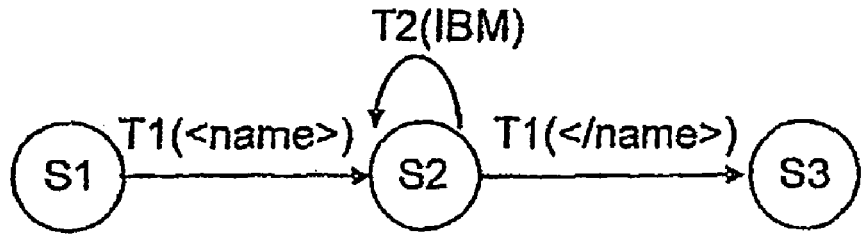

[Figure 16]

[Figure 17]

```
<xsd:element name="X">
  <xsd:complexType>
    <xsd:sequence>
      <xsd:element name="A" xsd:type=" xsd:int" />
      <xsd:element name="B" xsd:type=" xsd:int" />
      <xsd:element name="C" xsd:type=" xsd:int" />
    </xsd:sequence>
  </xsd:complexType>
</xsd:element>
```

[Figure 18]

```
<xsd:complexType name="all">
  <xsd:all>
    <xsd:element ref="A" />
    <xsd:element ref="B" />
    <xsd:element ref="C" />
  </xsd:all>
</xsd:complexType>
```

[Figure 19]
```
<xsd:attribute name="id" type="idType"/>
<xsd:simpleType name="  colorType">
  <xsd:restriction base="xsd:string">
    <xsd:enumeration value="red"/>
    <xsd:enumeration value="blue"/>
    <xsd:enumeration value="green"/>
  </xsd:restriction>
</xsd:simpleType>
```
[Figure 20]
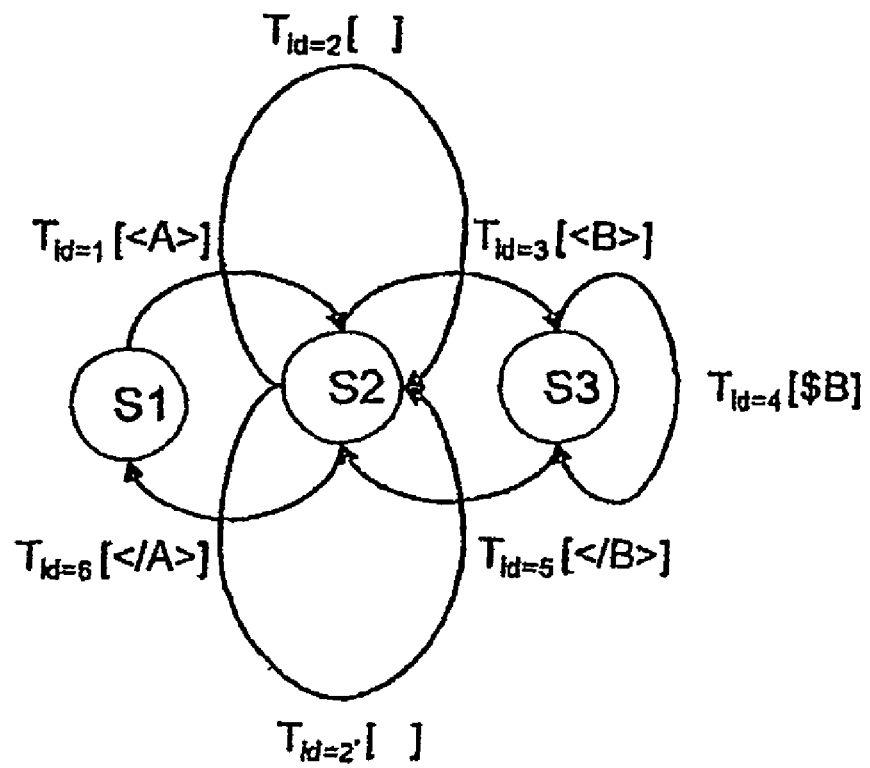

[Figure 21]

```
<xsd:schema xmlns:xsd="http://www.w3.org/2001/XMLSchema">
    <xsd:element name="customers" type="CustomersInfoType"/>
    <xsd:complexType name="CustomersInfoType">
     <xsd:sequence>
        <xsd:element name="customer" type="PersonInfoType" maxOccurs="unbou nded"/>
     </xsd:sequence>
    </xsd:complexType>
    <xsd:complexType name="PersonInfoType">
     <xsd:sequence>
        <xsd:element name="name"     type="xsd:string"/>
        <xsd:element name="street"   type="xsd:string"/>
        <xsd:element name="city"     type="xsd:string"/>
        <xsd:element name="telephone" type="xsd:string"/>
        <xsd:element name="postal"   type="xsd:string"/>
     </xsd:sequence>
    </xsd:complexType>
</xsd:schema>
```

[Figure 22]

```
<?xml version="1.0"?>
<customers>
<customer>
<name>Alice Smith</name>
<street>123 Maple Street</street>
<city>MillValley</city>
<telephone>111-111-1111</telephone>
<postal>90952</postal>
</customer>
</customers>
```

[Figure 23]

|         | Deltarser | Schema-aware Deltarser | Performance comparison |
|---------|-----------|------------------------|------------------------|
| 1k.xml  | 0.36406   | 0.2734                 | 0.751                  |
| 3k.xml  | 0.42735   | 0.37344                | 0.874                  |
| 7k.xml  | 0.4735    | 0.3328                 | 0.703                  |
| 13k.xml | 1.1515    | 0.9328                 | 0.810                  |
| 25k.xml | 2.5265    | 2.0282                 | 0.803                  |
| 50k.xml | 5.886     | 5.0235                 | 0.853                  |

[Figure 24]
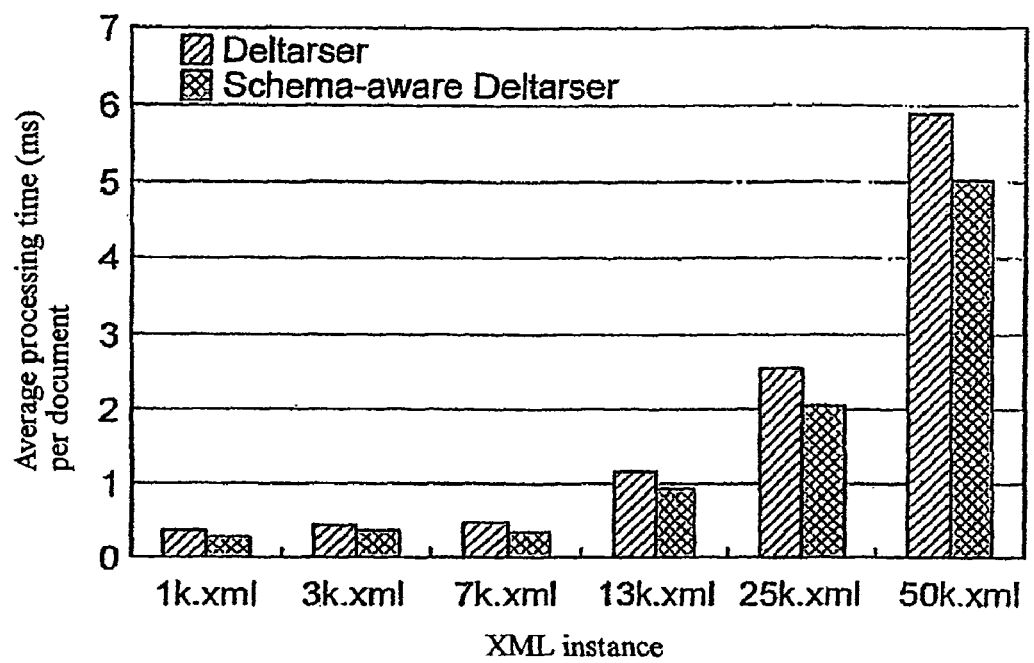

APPARATUS, METHOD, AND PROGRAM THAT PERFORMS SYNTAX PARSING ON A STRUCTURED DOCUMENT IN THE FORM OF ELECTRONIC DATA

CROSS-REFERENCE TO RELATED APPLICATIONS

This application is a Continuation of U.S. application Ser. No. 11/567,242 filed Dec. 6, 2006, now U.S. Pat. No. 7,707,491, Issued Apr. 27, 2010, the complete disclosure of which, in its entirety, is herein incorporated by reference.

BACKGROUND

Detailed Description of the Invention

1. Field of the Invention

The present invention relates to a structured document processing apparatus, method, and program and, more specifically, to a structured document processing apparatus, method, and program capable of improving the speed of syntactic parsing of structured documents in the form of electronic data.

2. Background Art

Structured documents in the form of electronic data are used today in various fields with the development of the object-oriented technology. Especially, the widespread use of the Internet and advances in Web service technology have led to the proliferation of XML (Extensible Markup Language) which is one of structured documents. The XML is also widely used on software architectures such as SOA (Service Oriented Architecture) and grid computing, and XML parsers (also called XML processors) are provided by a number of venders. An XML parser is a basic technique of the XML, which parses an XML document and processes the XML document to allow an application program to use it readily. It is crucially important to further improve the performance of the XML.

Therefore, attempts have been made to increase the processing speed of XML parsers on the basis of analysis of the difference between a parsed structured document and a structured document to be parsed, as described in Patent Document 1. The technique to increase the processing speed of an XML parser proposed in Patent Document 1 uses similarity between messages. An automaton is used as a mechanism for detecting the similarity and a state transition sequence (automaton) is dynamically generated from an XML document during runtime. Furthermore, messages are efficiently and speedily compared by performing comparison at the byte sequence level and only the difference between them is processed, thereby improving the processing speed.

[Patent Document 1] Published Unexamined Patent Application No. 2004-314713

DISCLOSURE OF THE INVENTION

Problems to be Solved by the Invention

An object of the present invention is to solve the following problems in order to further improve the XML parser proposed in Patent Document 1 (hereinafter referred to as Deltarser).

An automaton proposed with respect to Deltarser is generated as a state transition sequence (state transition diagram information) states defined using the granularity of SAX (Simple Application Program Interface for XML) events. A SAX event here is an interface that notifies an application program of an event each time the start or end of an element is found while an XML document is being analyzed.

However, the state transition processing described above is costly (and time-consuming) compared with byte sequence comparison and the conventional method degrades performance due to increase in the number of states or transitions. The smaller the granularity of states in the definition of a state transition, the higher the success rate of a byte sequence comparison but the more amount of time is required for the byte sequence comparison in the entire documents.

Therefore, there is the problem of finding an optimum granularity to define states for creating an automaton in order to build a fast XML parser.

Another problem is the costs for generating a new state sequence of an automaton required for difference analysis. Generation of states involves storing a context required for partial processing and copying byte sequences. The costs for these operations incur overhead. Consequently, there is the problem of how to avoid generating new state transitions during runtime.

The problems to be solved by the present invention described above will be further detailed below.

<Performance Deterioration Due to Increase in the Number of State Transitions>

According to the invention described in Patent Document 1, a SAX event is represented as one state constituting an automaton. FIG. 1 shows a graph of processing time versus the number of state transitions, measured in an experiment. Shown in FIG. 1 is average processing time (ms) taken for byte sequence matching in the same document (64 KB in file size) measured while changing the number of its constituent states (the X-axis). As can be seen from the graph, the processing time monotonically increases as the number of state transitions is increased. For example, the number of states when each blank is represented as one state was approximately 12,000, which was reduced by 4,000 to approximately 8,000 when the blanks were integrated into other states, and the cost for byte sequence matching alone decreased from 3.25 (ms) to 2.4 (ms). The difference in performance was 30%. The experiment shows that the smaller the number of state transitions, the smaller the overhead incurred by difference processing.

However, an automaton with less states is not necessarily better. As the number of states decreases, the probability of mismatch increases and, consequently, the cost for newly generating states adds to overhead. It is important to optimize an automaton in such a manner that the number of state transitions is minimized and yet the probability of match is maximized.

<Costly Generation of State Transitions.>

The invention in Patent Document 1 discloses basic processing by Deltarser, which is an XML parser the processing speed of which is improved by performing analysis of the difference between structured documents. Deltarser dynamically generates automatons from documents during runtime in order to efficiently detect differences. Here, one state transition of an automaton is a unit of SAX events. The cost of generating a state is higher than the costs of other tasks of an XML parser. Preventing frequent state generation will lead to improvement in overall performance.

FIG. 2 shows comparison between Deltarser and existing XML parsers (Xerces and Piccolo). The horizontal axis of the graph represents the number of parsed XML documents and the vertical axis represents the time taken for parsing. For example, comparison between Deltarser and Xerces shows that Xerces is faster up to the point at which the number of input documents exceeds 25. If an automaton can be created beforehand by using schema information, the cost in this area can be reduced and the superiority of Deltarser over the existing parsers can be achieved.

SUMMARY OF THE INVENTION

In order to solve the problems described above, the present invention proposes a method for optimizing an automaton by using statistical information concerning instance documents and schema information. The schema information can reduce the cost of generating a state transition sequence beforehand and can further optimize the number of states and transitions of the automaton. The optimization can improve the speed of syntax parsing by a parser such as an XML parser.

Examples of structured documents include, besides XML documents, XHTML (Extensible Hyper Text Markup Language) and SGML (Standard Generalized Markup Language) documents.

In particular, the present invention provides a structured document processing apparatus, method, and program having means for solving the problems as described below. The apparatus, method, and program differ from one another only in their implementations; they are based on the same technique in effect. Therefore, means for solving the problems provided in a structured document processing apparatus will be described as representatives.

(1) A structured document processing apparatus which performs syntax parsing of a structured document in the form of electronic data generates a state transition sequence of multiple states enabling sectioning of a structured document by using an automaton generating unit. The apparatus includes an instance document analyzing unit which, in generating the state transition sequence (automaton), integrates state transitions in the state transition sequence by using statistical information regarding an instance document which is the entity of the structured documents and statistically obtains patterns in the number of occurrences of repetitive elements in the state transitions by using the statistical information. The apparatus also includes a schema information analyzing unit which, in generating the state transition sequence from the structured document, integrates the state transitions in the state transition sequence by using schema information which defines the structure and format of information regarding the structured document. The apparatus also includes an automaton optimizing unit which mutually optimizes automatons integrated by the instance document analyzing unit and the schema information analyzing unit. Both of the instance document analyzing unit and the schema information analyzing unit optimize automatons. Furthermore, one of the instance document analyzing unit and the schema information analyzing unit can further optimize an automaton optimized by the other.

(2) There is provided the structured document processing apparatus according to item (1), wherein the structured document is an XML document and the multiple states enabling sectioning are defined by SAX events. While structured documents parsed by the structured document processing apparatus according to item (1) is not limited to XML documents, it is assumed in the following description that structured documents are XML documents and states are defined by SAX events.

(3) There is provided the structured document processing apparatus according to item (1), further including a consecutive state transition counting unit which assigns an ID to each of the state transitions in integration of the state transitions in the instance document analyzing unit, stores consecutively matching state transitions in the form of a list of IDs, and counts the occurrences of the consecutively matching state transitions by using the list of IDs. This configuration represents specific means for integrating state transitions.

(4) There is provided the structured document processing apparatus according to item (1), wherein the automaton optimizing unit optimizes the repetitive elements detected by the instance document analyzing unit even if the repetitive elements are nested.

(5) There is provided the structured document processing apparatus according to item (1), wherein the instance document analyzing unit fixes a pattern of any number of blank characters appearing between elements in the structured document by using the statistical information.

Items (3) to (5) given above show specific means for integrating state transitions, which will be detailed later.

The structured document processing apparatus including the means described above uses instance documents and schema information to integrate state transition sequences generated as a result of analyzing the states of a structured document. As mentioned earlier, optimization of an automaton using instance documents and optimization using schema information are not mutually exclusive but are complementary. An automaton optimized using one of the optimization methods can be further optimized by using the other. The processing has the effect of reducing the number of states to be parsed subsequently and, accordingly, the cost for state transitions can be reduced.

Advantages of the Invention

According to the present invention, in a structured document process such as XML, a technique for dynamically obtaining statistical information from input instance documents to perform fast analyzation is combined with a technique of using static, schema information and thereby the problems stated above can be solved. Consequently, the scope of application of a structured document processing apparatus such as Deltarser can be widened.

BRIEF DESCRIPTION OF THE DRAWINGS

FIG. 1 shows increases in average processing time with increasing number of states;

FIG. 2 shows comparison between Deltarser and existing XML parsers in state transition generation overhead;

FIG. 3 is a functional block diagram of a structured document processing apparatus of an embodiment of the present invention;

FIG. 4 illustrates a method for assigning IDs to state transitions and a method for counting repetitive elements;

FIG. 5 shows an optimized automaton;

FIG. 6 shows a loop automaton;

FIG. 7 shows an expanding automaton;

FIG. 8 shows a first XML instance document;

FIG. 9 shows a structure of an automaton of the first XML instance document before optimization;

FIG. 10 shows a flow of processing nested repetitive elements;

FIG. 11 shows a structure of optimized automaton of the first XML instance document 1;

FIG. 12 shows a second XML instance document;

FIG. 13 shows a structure of optimized automaton of the second XML instance document;

FIG. 14 shows classification of optimizations;

FIG. 15 shows an automaton of simple-type elements before optimization;

FIG. 16 shows an optimized automaton of the simple-type elements;

FIG. 17 shows a first exemplary XML Schema;

FIG. 18 shows a compositor;

FIG. 19 shows a second exemplary XML Schema;

FIG. 20 shows an example of state transitions due to blanks;

FIG. 21 shows an XML Schema used in an experiment in a first embodiment;

FIG. 22 shows an XML instance document used in the experiment in the first embodiment;

FIG. 23 shows result of the experiment in the first embodiment; and

FIG. 24 shows a graph of result of the experiment in the first embodiment.

DETAILED DESCRIPTION

The present invention will be described with respect to embodiments thereof with reference to the accompanying drawings.

FIG. 3 schematically shows functional blocks of a structured document processing apparatus 10 according to one embodiment of the present invention. The configuration provided in the following description is illustrative only and the present invention is not limited to the configuration.

The structured document processing apparatus 10 includes an input unit 1 which receives inputs from an operator, an output unit 2 which outputs the results of processing, and a memory 4 which stores input/output data and interim data. The structured document processing apparatus 10 further includes an instance document analyzing unit 5 which analyzes an input instance document, a schema information analyzing unit 6 which analyzes schema information defined in a predetermined schema language, an automaton generating unit 7a which generates a state transition sequence (automaton), an automaton optimizing unit 7 which mutually optimizing state transition sequences integrated by the instance document analyzing unit 5 and the schema information analyzing unit 6, a document parsing unit 8 which parses of various syntaxes of structured documents, and an API unit 9 notifies the necessary application program of a result of parsing which structure documents and acts as an interface with the application program.

The input unit 1 includes typical input devices such as a keyboard and mouse as well as input means which accepts data as a file. The output unit 2 includes a display device such as a CRT or liquid-crystal display as well as output means which outputs data as a file. A communication unit 3 may be provided optionally for outputting and inputting data to and from an external system through communications.

Structured documents 20 which are data input to the processing apparatus include instance documents 21 and schema information 22. The schema information can be omitted. If the schema information is omitted, a predetermined default is used. An instance document 21 is the entity of a structured document 20, the states of which are analyzed by the instance document analyzing unit 5 through an input unit. State-analyzed data (state transition sequences) are stored in the memory 4 as instance document statistical information 4a. The state-analyzed document is used as a parsed source structured document 4b in difference analysis of the next structured document to be parsed.

The instance document analyzing unit 5 includes a consecutive state transition counter (not shown) which has the functions of assigning an ID to each state transition, storing consecutively matching state transitions in the form of a list of IDs, and counting consecutively matching state transitions using the ID list in order to integrate multiple state transitions.

The schema information analyzing unit 6 analyzes the structure and format of an XML document written in a schema language such as DTD (Document Type Definition) or W3C (World Wide Web Consortium) XML Schema.

Processing using statistical information concerning instance documents and schema information will be detailed later.

The document parsing unit 8 actually parses the syntax of a structured documents 20. For example, it parses the elements and content of an XML document and transforms the XML document into a form such as SAX events or a DOM tree that is readily accessible to an application program. In doing this, the difference between the state transition sequence of the structured document 20 to be newly parsed and the state transition sequence of a set of parsed source documents 4b stored in the memory 4 is found and only the difference is analyzed to improve the efficiency of parsing. A state transition diagram is provided herein as a representation of the state transition sequence as will be described later.

The specific method for analyzing the difference is described in Patent Document 1 and therefore the description will be omitted herein.

An application program 30 accesses the structured document processing apparatus through an API. The API (Application Program Interface) unit 9 provides a typical interface such as DOM or SAX for XML documents. The API unit 9 also acts as an input/output unit, which is not depicted, in a broad sense.

As will be appreciated from the foregoing description, the structured document processing apparatus 10 may be a computer such as a personal computer or a server and is implemented by installing a computer program having required functions. Processing performed by the structured document processing apparatus 10 will be described below.

As has been described with respect to the problems, a state transition of an automaton has a significant impact on performance. To solve the problem, the present invention provides a method for decreasing the number of state transitions by optimizing an automaton. For example, if there are few state transition branches and the automaton follows almost only a certain state transition path, it is useless to represent the path as multiple states. In such a case, the multiple states can be integrated into one state to reduce the number of state transitions.

According to the present invention, the following two items of information concerning an XML instance document are used to optimize an automaton:

(A) Statistical Information About the Instance Document
(B) Schema Information

These techniques are not mutually exclusive but are complementary. That is, an automaton optimized using statistical information (A) can be optimized using schema information (B) to obtain an optimized automaton earlier before processing a set of documents required for obtaining a sufficient amount of statistical information. Also, an automaton optimized using schema information (B) can be optimized using statistical information (A), thereby patterns that appear during runtime but are not described in the schema can be reflected in the automaton. Optimization using each of the items of information (A) and (B) will be described below.

(A) Optimization Using Statistical Information About Instance Documents

This method uses statistical information about instance documents to optimize an automaton, thereby increasing the processing speed of an XML parser. In particular, the following two methods are provided.

(A-1) Integrating Multiple state Transitions
(A-2) Generating an Automaton Suitable for a Pattern of the Number of Occurrences of Repetitive Elements (A-1) Integrating Multiple State Transitions As described above, the cost incurred by state transitions must be considered in order to further improve the processing speed of Deltarser disclosed in Patent Document 1. Therefore, when consecutively matching state transitions are found with a high probability during byte sequence matching, it is preferable that those states be represented as a single state transition, rather than representing them individually. For example, if the character string <name>IBM</name> in XML is to be processed, state transitions, "<name>", "IBM", and "</name>" are usually generated. If these states match every time, then it is preferable that they be integrated into one representation "<name>IBM</name>". Such integration is performed by using statistical information.

First, consecutively matching state transition sequence must be found. An ID (identifier) is assigned to each state transition in order to identify the state transition. Each time a state transition matches an existing state transition, the ID of the state transition is recorded and added to a list of IDs (hereinafter referred to as the ID list). Recording of IDs is ended at the state at the position where the matching ends (denoted as Sn, where "n" is a natural number).

When state transitions consecutively match and the length of the ID list reaches 2 or more, a set of the state transitions contained in the ID list become candidates to be integrated into one state transition (the multiple state transitions are integrated into a single state transition). A counter is provided for the ID list. The counter is used for statistically analyzing the frequency of occurrences of a state transition sequence in a set of instance documents to be processed. The ID list and the counter are stored in state S1 and managed. Identical ID lists can be counted using various methods. For example, an appropriate hash function may be created, the hash value of an ID list may be used as a key, and a counter may be held as the value.

For example, consider a case where a document in which the value of the text node of <B> changes as <A> <B> 1 </B> </A>, <A> <B> 2 </B> </A> and so on. Here, an automaton as shown in FIG. 4 is generated and an ID is assigned to each state transition.

In this example, if 80 documents appear in which IDs 1 and 2 of state transitions consecutively match and IDs 4 and 5 consecutively match when 100 documents are processed, a hash table used for counting ID lists is stored in states 3 and 6.

After a sufficient amount of statistical information is collected, this mechanism shows the statistical frequency of occurrences of consecutive state transition sequences. A threshold for the frequency can be established and state transition sequences with frequencies exceeding the threshold can be integrated into one state transition. Basically, the set of state transitions before the integration is retained in order to avoid re-generating a state transition representing <A>, for example, in case that a document (for example <A> <C> $ C </C> </A>) that requires unintegrated state transitions is encountered. A mechanism for deleting documents that are statistically unlikely to appear can also be provided.

For example, a threshold of 80% is set so that state integration is performed if the same ID list appears with a probability of 80% or higher. The states before the integration are deleted. In this case, the automaton shown in FIG. 4 is optimized as an automaton as shown in FIG. 5.

(A-2) Generating an Automaton Suitable for a Pattern of the Number of Occurrences of Repetitive Elements Consider a case where a certain element appears repetitively (while two terms "repetition" and "iteration" are used herein, they are synonymous). Deltarser is capable of generating the following two types of automatons as an automaton representing such a case.

(1) Loop Automaton

If a repetitive element appears and a state representing the element is already generated, the automaton returns to the state and the same state transition as the first iteration is performed. FIG. 6 shows an automaton in which repetitions become loop state transition as a result.

(2) Expanding Automaton

When a repetitive element appears, a state transition is separately generated even if a state representing the element is already generated. FIG. 7 shows an automaton in which repetitions appear as state transitions in a straight line.

An advantage of a loop automaton is that redundant state transitions are not generated and therefore the automaton is compact and an anxiety about memory consumption associated with the number of states/transitions is small compared with that about an expanding automaton. However, after the transition from state S3 to state S2, there are two candidates, S1 and S3, to which the automaton can make transitions and the cost of determining to which state the automaton should make the transition (the cost of byte sequence matching and computation of the context (such as an element stack and name space)) is higher than that of the expanding automaton.

On the other hand, an expanding automaton has more states than a loop automaton but the cost of state transitions is lower than the former because it has only one candidate state to which transition can be made. However, expanding automatons are not suitable for a case where the number of repetitions of elements is always random, because the element would appear as many times as the repetitions. In such a case, it would be better off to use a loop automaton.

A method for selecting one of the two types of automatons in a statistical manner will be described below. A basic principle is to use the former method first to construct an automaton. Then, repetitions in a set of instance documents to be processed are detected and counted. If it is determined that the number of repetitions is a statistically fixed number and does not exceed a threshold, then the automaton is optimized as an expanding automaton. On the other hand, if the number of repetitions is statistically scattered and random, a loop automaton is used.

(1) Method for Detecting Repetitions

In the exemplary loop automaton in FIG. 6, it must be detected first that it returns to state S2 through the same path. This can be detected by recording the IDs of state transitions passed. That is, in the example in FIG. 6, the path with IDs {2, 3, 4} is added to state S2. The ID list differs from consecutive state transitions sequences described above. State transition sequences recorded in order to detect repetitions will be referred to as repetitive state transition sequences. Repetitive state transition sequences differ from consecutive state transition sequences in that state transitions passed are recorded regardless of whether they match or not.

For example, consider a document <X> <A> 1 </A> <A> 2 </A> <A>3 </A> </X>. Because three repetitions of the set <A> $ A </A> appear after <X>, three repetitions of the sequence with state transition IDs 2, 3, and 4 are recorded in state S2. To find the pattern of the number of repetitions, the IDs in the document set to be processed are recorded in the same way and information as to whether the number of repetitions is random to some extent or whether a certain fixed number of repetitions appear frequently can be statistically obtained. Based on the information, if the number of repetitions is fixed, it is optimized as an expanding automation as described above. If it is determined that the number of repetitions is random, the loop automaton is used as is.

(2) Dealing With Nested Repetitive Elements

Repetitions may appear in nested form. For example, in an XML instance document shown in FIG. 8, an arbitrary number of repetitions of the innermost element <C> appear and two repetitions of the outer element <B> appear. The document can be represented as a loop automaton as shown in FIG. 9. Here, a state transition caused by the tag <A> together with ID number is denoted as $T_{id=1}$ [<A>]. Even if a repetitive element is nested in this way, it is necessary to enable the number of repetitions to be counted as described in (1).

According to this method, repetitions of an element in a loop nested in another loop and repetition of the nesting loop are counted as described below.

The process will be described with reference to the flowchart in FIG. 10.

First, the innermost loop is detected and set as the initial "inner loop" (step S1). Then, the number of iterations of the inner loop is recorded by using method (1) (step S2).

If the nearest outer loop enclosing the inner loop is found (step S3: Yes), it is recorded as a state transition sequence that passes only the ID list of one iteration of the loop even if the number of iterations of the inner loop is more than one (step S4). The number of iterations of the outer loop is counted using the counter of the ID list (step S5). If an outer loop is not detected at step S3 (step S3: No), the process will end. Next, the outer loop is set as an inner loop (step S6) and steps S3, S4, and S5 are performed.

For example, consider the example in FIG. 8 as an XML instance document. In this case, a state transition sequence on the ID list {3, 4, 5} is recorded in S3. Because the element C repeatedly appears, the state transition of the ID list {3, 4, 5} forms a loop. After the repetitions of the element C ends and the end tag of the element B appears, the document moves to state S2. Using only the method for detecting repetitions described in (1), an ID list, {1, 2, 3, 4, 5, 3, 4, 5, 3, 4, 5, 3, 4, 5, 6, 7}, is generated. Any number of repetitions of the sequence of IDs 3, 4, 5 in the ID list can appear. Method (2) is used to avoid this. Using method (2), {3, 4, 5}, which has a loop structure, is considered as one iteration of loop at its outer loop and is represented as an ID list, {1, 2, 3, 4, 5, 6, 7}. Thus, the repetitions can be properly counted.

FIG. 9 shows an automaton of the instance document shown in FIG. 8 before optimization. After it is optimized by using method (2), the interior will be loop automatons and the exterior will be an expanding automaton as shown in FIG. 11.

FIG. 12 shows another exemplary instance document to demonstrate that the same can be accomplished in another case. In this case, the number of iterations of the innermost loop of the element C is fixed but the number of iterations of loop of the element B is arbitrary. Repetitions can be properly counted by using the method described above. As a result, an automaton as shown in FIG. 13 is generated.

(B) Optimization and Prebuilding of an Automaton Using Schema Information

Schema information that can be used to optimize an automaton herein is XML Schema specified in W3C. Other schema language such as DTD, RELAX (Regular Language description for XML), or NG may also be used.

FIG. 14 shows a flow of optimization. First, elements to be processed are classified according to whether they have an attribute (as shown in the left-hand part of FIG. 14), and are further classified as a simple or complex type (as shown in the right-hand part of FIG. 14). The term "simple type element" refers to an element that is a simple content model and does not have an attribute. A simple content model accepts only text nodes as its child elements. The other elements (that are simple content models or other content models that have an attribute) are defied as complex type. There are mixed contents in which text nodes and child elements are mixed, which will not be considered herein.

Methods for optimizing each of these types will be described below.

(B-1) Optimization of Simple-Type Elements (1) Simple Content Elements Having a Fixed Value If a "fixed" attribute is specified in "xsd: element", a simple content element can be fixed by using this attribute.

Example)

XML Schema: <xsd: element name="name" type="xsd: string" fixed "IBM/>

XML instance: <name> IBM </name>

If there were not schema information, each of "<name>", "IBM", and "</name>" would be defined as a state and three state sequences as shown in FIG. 15 would be generated. By using schema information as described above, the three states can be integrated into a single state as shown in FIG. 16. In this way, states can be integrated by using schema information, there y improving the processing speed.

(2) Elements for Which a Candidate Value is Specified

If candidate values for a schema or candidate values between elements is specified, the information can be used to create their state transitions beforehand (automaton prebuilding).

(B-2) Optimization of Complex-Type Elements (1) Element Followed by a Fixed Element If "xsd: sequence" in XML Schema is specified, an element is always followed by a fixed element, provided that minOccurs is not zero. "Xsd: sequence" is a compositor that defines an ordered group of elements. Using this information, two different states can be integrated into a single state.

For example, the following XML instance using XML Schema shown in FIG. 17 is considered.

XML Instance

<X> <A> 1 </A> <B> 2 </B> <C> 3 </C> </X>

The XML instance given above usually has the following 11 state transitions: ("<X>", "<A>", 1, "</A>", "<B>", 2, "</B>", "<C>", 3, "</C>", "</X>). Using schema information, the number of state transitions can be reduced to 7 as: "<X> <A>", 1, "</A> <B>", 2, "</B> <C>", 3, "</C> </X>.

(2) Element Followed by One of Fixed Candidate Elements

If candidate elements are specified in "Xsd: choice", candidate elements that follow the element are known beforehand. This information can be used to create state transitions and thus the cost of creating state transitions can be reduced. "Xsd: choice" is a compositor that defines a group of exclusive elements (only one of the elements can be selected) or compositors. "Xsd: choice" can specified with maxOccurs=unbound or a limited number of occurrences for maxOccurs.

(3) Compositor Describing an Element Group in no Particular Order

"Xsd: all" is used to describe a group of elements that appear zero times or once in any order. FIG. 18 shows an example.

This schema represents that each of A, B, and C appears once in no particular order (the default is minOccur=1). In this case, all possible combinations of <A>, <B>, and <C> (for example <A/> <B/> <C/> are represented by one state) may be built beforehand from the viewpoint of reducing the number of states. If the size of the automaton is considered, nodes that are not used for a given period of time or longer after execution may be removed.

(4) Repetitive Elements

If "unbound" is specified for maxOccurs, it is known that elements appear a variety of times, therefore repetitive transitions are created (with confidence).

(B-3) Elements With an Attribute (1) Elements With a Fixed Attribute

If a fixed attribute value or a fixed value between elements is specified in a schema, the information can be used to integrate a state with the preceding or succeeding state. If a "fixed" attribute is specified in xsd: attribute, the attribute value is fixed and the same value that is specified must be used. Exemplary Schema and XML instances are shown below.

XML Schema: <xsd: attribute name="year" type="xsd: date" fixed="2004"/>
XML instance <item year="2004">

(2) Elements With Specified Candidate Attributes

Candidate values can be used to build state transitions beforehand. In the following XML Schemas, it is defined that only "red", "blue", and "green" appear as id attribute values. This information can be used to create state transitions beforehand. FIG. 19 shows an exemplary XML Schema.

(C) Dealing With Blanks

XML allows any number of blanks to be used. The description of optimization methods so far has used examples in which no blanks are included. However, XML' restrictions on appearance of a blank character are loose. Any number of blanks can appear between elements and a blank can appear in an element name. The present invention uses statistical information about instance documents (A) to address variations of blanks.

FIG. 20 shows an example of state transitions due to blanks. State transitions due to blanks are the same as those due to other elements: loop state transitions as in the state transitions with ID=2 and ID=2' are created. The state transition with ID=2 is a case where three blanks appear between <A> and <B> (<A>□□□<B>); the state transition with ID=2' is a case where five blanks appear between <A> and <B> (<A>□□□□□<B>). Which of the transitions statistically more frequently occur can be found by using statistical information (A). Thus, a pattern of the number of blanks can be identified and the blanks can be integrated with other state transitions as described above.

First Embodiment

FIGS. 21 and 22 show results of an embodiment of the present invention. Shown in FIGS. 21 and 22 are results of experiments conducted on an example in which a method of the present invention is implemented based on an existing XML parser product A from IBM. XML parser product A has an architecture in which a schema is converted into an intermediate representation and the intermediate representation is executed on a virtual machine to verify a schema. In the experiment, automaton optimization proposed herein was performed by exploiting the fact that the next element to appear is uniquely determined by a ReadOne instruction, which is an instruction to process "xsd: sequence". The following experimental environment and XML Schema files and XML instance files were used.

<Experimental Environment>
ThinkPad® T43 2668-72J (Pentium® M 760, 2.0 GHz, 1 GB RAM)
Windows® XP Professional
Java® VM: Sun JVM 1.42

Compared Parsers
1) Deltarser: XML parser in which the invention described in Patent Document 1 is implemented
2) Schema-aware Deltarser: Deltarser to which a method of the present invention is applied
Method for Comparison
1) After 10,000 warmups, processing was performed 10,000 times and the average time was calculated.
2) Partial processing of all text elements (including the same texts) is performed.
Test Document
1) The XML Schema file shown in FIG. 21
2) The instance document shown in FIG. 22
<Results of Experiments>

XML instances with various sizes were used to measure the effects of the present method (Schema-aware Deltarser). FIGS. 23 and 24 show the result of the experiment. In FIGS. 23 and 24, the file names (xxx.xml) of the XML instance indicate the sizes of the documents (in bytes). The measured processing time is expressed in milliseconds.

As can be seen from FIGS. 23 and 24, processing time of all documents are improved by 13 to 30%. Although measurements are performed only on optimization of xsd sequence in the experiment, it is apparent from the experiment that processing speed can be improved in other optimization cases by reducing the number of state transitions using schema information. Because the experiment also shows that processing speed can be improved by integrating state transitions, the method using optimization with statistical information about instance documents has the advantageous effect of improving processing speed.

Second Embodiment

The present invention can be applied to any application program to be XML-analyzed for which statistical information about instance documents and schema information is provided. For example, the present invention can be used in a particular XML markup language processing system or in middleware that processes Web services.

Effects of optimization of automatons using statistical information is not shown herein. However, effects equivalent to or greater than those of the method using schema information can be obtained. This is because both the information reflected in the schema information and information that is not reflected in the schema information can be used for optimizing an automaton by reflecting patterns of documents during runtime in the automaton. A large amount of information used for integrating states that is not included in the schema information can be obtained by statistical processing of instance documents. However, it should be noted that the method using statistical information requires a number of trials to obtain appropriate statistical information, which requires an extra amount of time.

While the present invention has been described with respect to embodiments and examples, the technical scope of the present invention is not limited to the scope described with respect to the embodiments. Various modification and improvements can be made to the embodiments. It will be apparent from the Claims that embodiments to which modifications and improvements are made are also included in the technical scope of the present invention.

The structured document processing apparatus or the structured document processing method described as an embodiment of the present invention can be implemented by a program that causes a computer or a system on a computer to execute the functions the apparatus or method. A computer-readable recording medium on which the program is stored may be an electronic, magnetic, optical, electromagnetic, infrared, or semiconductor system (or apparatus or equipment) or a signal-carrying medium. Examples of the computer-readable recording medium include a semiconductor or solid-state storage device and a magnetic tape. Examples of removable computer-readable recording media include a semiconductor or solid-state storage device, a magnetic tape, a removable computer diskette, a random access memory (RAM), a read-only memory (ROM), a rigid magnetic disk, and an optical disk. Examples of currently available optical disks include a compact disk read-only memory (CD-ROM), a compact disk read/write) (CD-R/W), and a DVD.

The invention claimed is:

1. A structured document processing apparatus performing syntax parsing of a structured document in the form of electronic data, comprising:
   a computing device including a processor reading instructions from a non-transitory storage medium performing the steps of:
      automaton generating which generates a state transition sequence of a plurality of states enabling sectioning of a structured document into a plurality of nodes;
      instance document analyzing which integrates state transitions in the state transition sequence generated by the automaton generating by using statistical information regarding an instance document which is an entity of the structured document and statistically obtains patterns in the number of occurrences of repetitive elements in the state transitions by using the statistical information;
      schema information analyzing which integrates the state transitions in the state transition sequence generated by the automaton generating by using schema information which defines a structure and a format of information regarding the structured document;
      automaton optimizing which mutually optimizes automatons integrated by the instance document analyzing and the schema information analyzing; and
      counting occurrences of consecutively matching state transitions by using a list of IDs.

2. The structured document processing apparatus according to claim 1, wherein the structured document is an Extensible Markup Language (XML) document.

3. The structured document processing apparatus according to claim 1, wherein the plurality of states enabling sectioning are defined by Simple Application programming interface for XML (SAX) events.

4. The structured document processing apparatus according to claim 1, further comprising:
   consecutive state transition counting which assigns the ID to each of the state transitions in integration of the state transitions in the instance document analyzing;
   storing consecutively matching state transitions in the form of the list of IDs.

5. The structured document processing apparatus according to claim 1, wherein the automaton optimizing optimizes the repetitive elements detected by the instance document analyzing even if the repetitive elements are nested.

6. The structured document processing apparatus according to claim 1, wherein the instance document analyzing fixes a pattern of any number of blank characters appearing between elements in the structured document by using the statistical information.

7. A computer-implemented structured document processing method for performing syntax parsing of a structured document in the form of electronic data, comprising:
   generating, by a computing device, a state transition sequence of a plurality of states enabling sectioning of a structured document into a plurality of nodes;
   integrating, by said computing device, state transitions in the state transition sequence generated at the automaton generating by using statistical information regarding an instance document which is the entity of the structured document and statistically obtaining patterns in the number of occurrences of repetitive elements in the state transitions by using the statistical information;
   integrating, by said computing device, the state transitions in the state transition sequence generated at the automaton generating by using schema information which defines the structure and format of information regarding the structured document;
   mutually optimizing, by said computing device, automatons integrated at the instance document analyzing and the schema information analyzing; and
   counting, by said computing device, occurrences of consecutively matching state transitions by using a list of IDs.

8. The structured document processing method according to claim 7, wherein the structured document is an Extensible Markup Language (XML) document.

9. The structured document processing method according to claim 7, wherein the plurality of states enabling sectioning are defined by Simple Application programming interface for XML (SAX) events.

10. The structured document processing method according to claim 7, further comprising:
    assigning, by said computing device, the ID to each of the state transitions in integration of the multiple state transitions at the statistically obtaining;
    storing consecutively matching state transitions in the form of the list of IDs.

11. The structured document processing method according to claim 7, wherein the automaton optimizing optimizes the repetitive elements even if the repetitive elements are nested.

12. The structured document processing method according to claim 7, wherein a pattern of any number of blank characters appearing between elements in the structured document is fixed by using the statistical information at the statistically obtaining.

13. A non-transitory computer-readable medium for performing syntax parsing of a structured document in the form of electronic data, the computer program causing a computer perform:
    generating a state transition sequence of a plurality of states enabling sectioning of a structured document into a plurality of nodes;
    integrating state transitions in the state transition sequence generated at the automaton generating by using statistical information regarding an instance document which is the entity of the structured document and statistically obtaining patterns in the number of occurrences of repetitive elements in the state transitions by using the statistical information;
    integrating the state transitions in the state transition sequence generated at the automaton generating by using schema information which defines the structure and format of information regarding the structured document;
    mutually optimizing automatons integrated at the statistically obtaining and the integrating; and
    counting occurrences of consecutively matching state transitions by using a list of IDs.

14. The non-transitory computer-readable medium according to claim 13, wherein the structured document is an Extensible Markup Language (XML) document.

15. The non-transitory computer-readable medium according to claim 13, wherein the plurality of states enabling sectioning are defined by Simple Application programming interface for XML (SAX) events.

16. The non-transitory computer-readable medium according to claim 13, further comprising:
assigning the ID to each of the multiple state transitions in integration of the state transitions at the statistically obtaining;
storing consecutively matching state transitions in the form of the list of IDs.

17. The non-transitory computer-readable medium according to claim 13, wherein the automaton optimizing optimizes the repetitive elements even if the repetitive elements are nested.

18. The non-transitory computer-readable medium according to claim 13, wherein a pattern of any number of blank characters appearing between elements in the structured document is fixed by using the statistical information at the statistically obtaining.

* * * * *